(12) United States Patent
Enyedi et al.

(10) Patent No.: US 11,394,638 B2
(45) Date of Patent: Jul. 19, 2022

(54) METHOD AND APPARATUS FOR FORWARDING NETWORK TRAFFIC ON MAXIMALLY DISJOINT PATHS

(71) Applicant: Telefonaktiebolaget LM Ericsson (publ), Stockholm (SE)

(72) Inventors: Gabor Sandor Enyedi, Budapest (HU); János Farkas, Kecskemét (HU); Zoltán Turányi, Szentendre (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/954,883

(22) PCT Filed: Dec. 21, 2017

(86) PCT No.: PCT/EP2017/084203
§ 371 (c)(1),
(2) Date: Jun. 17, 2020

(87) PCT Pub. No.: WO2019/120549
PCT Pub. Date: Jun. 27, 2019

(65) Prior Publication Data
US 2020/0403906 A1 Dec. 24, 2020

(51) Int. Cl.
*H04L 12/703* (2013.01)
*H04L 12/721* (2013.01)
(Continued)

(52) U.S. Cl.
CPC .............. *H04L 45/28* (2013.01); *H04L 45/12* (2013.01); *H04L 45/22* (2013.01); *H04L 45/24* (2013.01)

(58) Field of Classification Search
CPC combination set(s) only.
See application file for complete search history.

(56) References Cited

U.S. PATENT DOCUMENTS

| 8,958,286 B1 | 2/2015 | Atlas et al. |
| 9,100,328 B1 * | 8/2015 | Atlas ........................ H04L 45/28 |

(Continued)

FOREIGN PATENT DOCUMENTS

| CN | 101207560 A | 6/2005 |
| CN | 104509044 A | 4/2015 |

(Continued)

OTHER PUBLICATIONS

International Search Report and Written Opinion dated Sep. 20, 2018 for International Application No. PCT/EP2017/084203 filed on Dec. 21, 2017, consisting of 11-pages.

(Continued)

*Primary Examiner* — Xavier S Wong
(74) *Attorney, Agent, or Firm* — Christopher & Weisberg, P.A.

(57) ABSTRACT

The present disclosure relates to forwarding of network traffic. In one of its aspects, the technology presented herein concerns a method for forwarding network traffic from multiple sources to multiple destinations on maximally disjoint paths by maximally redundant trees, MRTs. The method is implemented in a network element implementing multipoint-to-multipoint functionalities in a path computation element, PCE, of a network, wherein the network includes a plurality of network elements. According to the method, an almost directed acyclic graph, ADAG, is computed for the network. Next hops along MRTs are computed by using the ADAG. One or more valid path pair(s) of the computed MRTs that is/are disjoint is/are determined and then, the network traffic is forwarded by using the valid path pair(s) of the MRT(s).

19 Claims, 10 Drawing Sheets

(51) Int. Cl.
    *H04L 12/707*      (2013.01)
    *H04L 45/28*      (2022.01)
    *H04L 45/12*      (2022.01)
    *H04L 45/00*      (2022.01)
    *H04L 45/24*      (2022.01)

(56) References Cited

U.S. PATENT DOCUMENTS

| | | | |
|---|---|---|---|
| 9,571,387 | B1 | 2/2017 | Atlas et al. |
| 2015/0207671 | A1* | 7/2015 | Farkas ............ H04L 45/128 370/228 |
| 2019/0036717 | A1* | 1/2019 | Kebler ............ H04L 12/18 |

FOREIGN PATENT DOCUMENTS

| | | |
|---|---|---|
| CN | 106170952 A | 11/2016 |
| CN | 106330749 A | 1/2017 |
| WO | 2015059123 A1 | 4/2015 |

OTHER PUBLICATIONS

G. Enyedi et al. "An Algorithm for computing IP/LDP Fast Reroute Using Maximally Redundant Trees (MRT-FRR)" Internet Engineering Task Force (IETF), Jun. 2016, consisting of 118-pages.

A. Atlas et al. "An Architecture for IP/LDP Fast Reroute Using Maximally Redundant Trees (MRT-FRR)" Internet Engineering Task Force (IETF), Jun. 2016, consisting of 44-pages.

IEEE Standard for Local and metropolitan area networks—Bridges and Bridged Networks Amendment 24: Path Control and Reservation; IEEE Std 802.1Qca™—2015 (Amendment to IEEE Std 802.1Q™—2014 as amended by IEEE Std 802.1Qcd™—2015 and IEEE Std 802.1Q—2014/Cor—Jan. 2015); Sep. 2015, consisting of 120-pages.

Enyedi, G., Rétvári, G. "Finding multiple maximally redundant trees in linear time", Periodica Polytechnica Electrical Engineering, 54(1-2), pp. 29-40, 2010. https://doi.org/10.3311/pp.ee.2010-1-2.04.

A. Atlas et al. "Algorithms for computing Maximally Redundant Trees for IP/LDP Fast-Reroute"; Routing Area Working Group; Mar. 2012, consisting of 42-pages.

EPO Annex to Communication dated Jun. 9, 2021 for Patent Application No. 17825529.5, consisting of 5-pages.

Gabor Enyrdi et al.; Finding Multiple Maximally Redundant Trees in Linear Time; Internet Citation, May 25, 2010, consisting of 11-pages.

Chinese Search Report and English Summary Translation dated Nov. 8, 2021 for Application No. 2017800983118, consisting of 8 pages.

Yao et al. Discussion on Reliability Problems and Solutions of MPLS LDP; New Focus; Sep. 5, 2013, consisting of 2 pages.

\* cited by examiner

METHOD AND APPARATUS FOR FORWARDING NETWORK TRAFFIC ON MAXIMALLY DISJOINT PATHS

CROSS-REFERENCE TO RELATED APPLICATIONS

This application is a Submission Under 35 U.S.C. § 371 for U.S. National Stage Patent Application of International Application Number: PCT/EP2017/084203, filed Dec. 21, 2017 entitled "METHOD AND APPARATUS FOR FORWARDING NETWORK TRAFFIC ON MAXIMALLY DISJOINT PATHS," the entirety of which is incorporated herein by reference.

TECHNICAL FIELD

The present disclosure generally relates to forwarding of network traffic. In particular, the various embodiments described in this disclosure relate generally to a method and a network element for forwarding network traffic on maximally disjoint paths by Maximally Redundant Trees (MRTs).

BACKGROUND

This section is intended to provide a background to the various embodiments of the invention that are described in this disclosure. Therefore, unless otherwise indicated herein, what is described in this section should not be interpreted to be prior art by its mere inclusion in this section.

As the use of network communication continues to increase, the need for redundancy in network communication systems has become increasingly important. Network redundancy is a process through which additional or alternate instances of network devices, equipment and communication mediums are installed within network infrastructure. Redundancy is used for ensuring network availability in case of a network device or path failure and unavailability. As such, it provides a means of network failover. Typically, network redundancy is achieved through the addition of alternate network paths. When the primary path is unavailable, the alternate path can be instantly deployed to ensure minimal downtime and continuity of network services.

In order to ensure network redundancy, maximally redundant trees (MRTs) have evolved. MRTs are used for providing protection in networks, where forwarding is based on destination address and not on an address belonging to the path such as Resource Reservation Protocol (RSVP). Examples of such networks are e.g. Internet protocol (IP) networks, label distribution protocol (LDP)-based multiprotocol label switching (MPLS) networks and Ethernet networks. For IP and LDP, such solution is described by Internet engineering task force (IETF) in RFC7811 and RFC7812 and for Ethernet it is described in 802.1Qca by the institute of electrical and electronics engineers (IEEE).

Maximally redundant trees (MRTs) are a pair of directed spanning trees of an undirected graph with a common root node. The path from any node X to the root along the first tree and the path from the same node X to the root along the second tree share the minimum number of nodes and the minimum number of links. These two paths along the two trees typically are maximally node- and link-disjoint. Only those nodes and links that cannot be avoided are typically used in both paths. The shared nodes and links between the source and the destination are called cut-nodes (interchangeably referred to cut-vertex herein) and cut-links. A removal of such cut-vertex will partition the network. When two paths are guaranteed to be completely disjoint, the network is known as 2-node-connected. However, maximum redundancy is still provided also when this is not the case.

In order to compute MRTs, a partial order of the nodes is needed. A partial order of the nodes (interchangeably referred to vertices herein) of a graph, is a relation very similar to a total order, known for e.g. the natural numbers, except that there can also be unordered pair of elements. The traditional order of the natural numbers is a total order as any two elements can be compared. A Directed Acyclic Graph (DAG) defines a partial order of the set of its vertices, i.e. A<B if there is a directed path from A to B. If A and B are not ordered, the notation A ∦ B is generally used.

An almost DAG (ADAG) is a directed graph with a single root node, as illustrated in FIG. 1. FIG. 1 illustrates a 2-connected graph and its spanning ADAG rooted at R. It is "almost" a DAG, since it, in contrast to a DAG, comprises cycles. However, all the directed cycles comprise the root. Another definition of an ADAG is that it is a directed graph with a root node R which will become a DAG if R is removed. A spanning ADAG with an arbitrary selected root may be found in any 2-connected graph in linear time.

A Generalized ADAG (GADAG) is a natural generalization of the ADAG to graphs that are not 2-connected. While ADAGs may only be found in 2-connected graphs, a network may easily be non-2-connected. The network may for example become non-2-connected due to a network failure, and the network will continue to be non-2-connected as long as the failed resource is not fixed. In such non-2-connected networks, there are still 2-connected blocks, where ADAGs may be found. A block is a maximal subgraph without any single cut-vertex, i.e. a 2-connected subgraph. Two nodes connected with a single link are also considered a block. The GADAG has an arbitrary global root and one local root in each of its blocks. The local root of the block(s) comprising the global root is the global root, while the local root of other blocks is the node that is closest to the global root. Local roots that are not the global root are cut-vertices and belong to multiple blocks at the same time. However, a local root in one block is not necessarily the local root for another block that it belongs to. An example graph and its spanning GADAG with global root R is illustrated in FIG. 2.

FIG. 2 illustrates a GADAG with four blocks; wherein the first block comprises A, B, C, D and R; the second block comprises C, I and J; the third block comprises B, E, F and G; and the fourth block comprises G and H. If R is the global root, the closest nodes, i.e. the local roots in the GADAG, are R, C, B, G, respectively.

An ADAG may be used to define something similar to a partial ordering. However, as described above, an ADAG is not a DAG, it comprises cycles, but all the cycles go through the root node R. Thus, the partial ordering may be defined such that node N<M if there is a directed path N→M, which does not comprise the root R. The root node R is a special node, it is both greater and lesser than all the nodes in the ADAG. In case the network is not 2-connected and a GADAG is calculated, a partial order is found for each of its block.

To compute the MRTs in a 2-connected graph, the ADAG on the graph is first calculated and the partial ordering it creates is used. Subsequently, each node S finds the nodes ordered with S and finds the next hops along an increasing path for nodes greater than S and the next hops along a decreasing path for nodes lesser than S. As the root R is both greater and lesser than any node S, there must be both an increasing and a decreasing next hop towards the root R. The increasing MRT where links in the ADAG are taken in a direction from a lower topologically ordered node to a higher one is called the MRT-blue and the decreasing MRT where links in the ADAG are taken in the direction from a higher topologically ordered node to a lower one is called the MRT-red. By using the increasing and decreasing next hops, each node S will accordingly find a blue SD_blue and a red SD_red next hop towards each destination node D by following the rules specified below:

1. If S<D:
   SD_blue=the next hop along an increasing path to D
   SD_red=the next hop along a decreasing path to R
2. If S>D:
   SD_blue=the next hop along an increasing path to R
   SD_red=the next hop along a decreasing path to D
3. If S ≠ D:
   SD_blue=the next hop along a decreasing path to R
   SD_red=the next hop along an increasing path to R These next hops define the two MRTs, the so called blue tree and the so called red tree. The proof that these next hops indeed define MRTs may be found in a scientific paper by Gábor Enyedi and Gábor Retvari, *Finding Multiple Maximally Redundant Trees in Linear Time*, Periodica Polytechnica Electrical Engineering 54.1-2 (2011): 29-40.

For the ordered case, the basic idea is generally to use the ordered path for one of the paths and then to go through the root R and perform a "turn around" at there for the other path. For the unordered case, the blue path decreases until a node lesser than D is reached, and from that node, the increasing direct path is used with respect to rule 1 above. Furthermore, the red path increases until a node greater than D is reached, and from that node, rule 2 is used. For this case, it is essential to note that ADAGs constructed e.g. by the method in RFC7811 are such that only one link goes into the root.

A more detailed description of how to compute MRT next hops may be found in IETF RFC 7811 or in the scientific paper by Gábor Enyedi and Gábor Retvari, as mentioned above.

SUMMARY

It is in view of the above considerations and others that the various aspects and embodiments disclosed herein have been made.

The inventors have realized that while traditional MRT may provide a solution for redundancy in one-source-to-one-destination systems, there is no prior known solution for providing redundancy in a multisource-to-multi-destination system (for example a 2-sources-to-2-destinations system) with address-based routing.

One example of such use case for providing redundancy in a multisource-to-multi-destination system is when the sources and/or destinations may be movable, such as when an entity is remotely controlled. Such an example is illustrated in FIG. 3. FIG. 3 illustrates a robot 200 e.g. in a factory. The robot 200 is controlled by an external controller. In order for the system to be provided with 1+1 protection for all components of the system, at least two separate controllers S1, S2 typically have to be provided. As the robot 200 may be movable, it may be communicatively connected to the controllers using radio connections, illustrated with the dashed arrows in FIG. 3. Accordingly, the system may comprise two separate radio connections, probably on different frequencies, using two different base stations D1, D2 possibly with overlapping coverage. Thus, the system may comprise two sources (the controllers S1, S2) and two destinations (the base stations D1, D2). Furthermore, if traffic is bidirectional, the controllers S1, S2 are the sources in one direction and the base stations D1, D2 are the sources in the other direction. Moreover, the two paths from the controllers S1, S2 towards the two base stations D1, D2 may be disjoint, such that in case of a link or node failure in the network between the controllers S1, S2 and the base stations D1, D2, at least one of the connections survive. Furthermore, as the robot 200 may be movable, handover support may also be needed.

Existing technology, not based on address-based routing, may be available to solve this problem. For example, MPLS with RSVP may provide disjoint paths between multiple sources and multiple destinations. However, such solutions need to have information about each possible base station pair in the transport nodes and accordingly need to install and continuously refresh this information. Considering the above described case, where an entity is remotely controlled with two controllers talking to two base stations using disjoint paths, the two base stations may change when the robot moves, and all the nodes of the network would thus need to be partially reconfigured. Furthermore, assume that there are several such robots working together, hence it is not be possible to reconfigure the whole network every time a handover takes place for a robot 200. It is not possible to continuously perform these costly path re-configurations. Accordingly, it would be advantageous if only the controllers S1, S2 track the base stations D1, D2 where the robot is communicatively connected. Moreover, as most nodes have no information about the current position of a particular robot, packets sent to a given robot cannot in general use the address of the robot directly and the nodes cannot forward them without information. Instead, the packets typically have to be sent to a base station by using that base station's address. Accordingly, a solution that can give disjoint paths for any controller/base station combination in such way that only the sources, i.e. the controllers, need to track the destination, i.e. robots position is needed.

In view of the above, it is therefore a general object of the aspects and embodiments described throughout this disclosure to provide a different solution for the multisource-to-multi-destination challenge with address-based routing.

This general object has been addressed by the appended independent claims. Advantageous embodiments are defined in the appended dependent claims.

According to a first aspect, there is provided a method for forwarding network traffic from multiple sources to multiple destinations on maximally disjoint paths by maximally redundant trees, MRTs. The method is advantageously implemented in a network element implementing multipoint-to-multipoint functionalities in a path computation element, PCE, of a network. The network comprises a plurality of network elements.

An almost directed acyclic graph, ADAG, is computed for the network. The ADAG is a graph abstraction of the network, wherein the plurality of network elements are the vertices of the ADAG and links connecting the plurality of network elements are the directed edges of the ADAG. The ADAG has an arbitrary root. By using the ADAG, next hops along MRTs are computed. One or more valid path pair(s) of the computed MRTs that is/are disjoint is/are determined. Then, the network traffic is forwarded by using the valid path pair(s) of the MRT(s).

In one embodiment, when the graph abstraction of the network is a non-2-connected graph, the method additionally comprises computing the ADAG for the network by computing a generalized almost directed acyclic graph, GADAG, for the network. The GADAG is a graph abstraction of the network, the plurality of network elements are the vertices of the GADAG and links connecting the plurality of network elements are the directed edges of the GADAG. The GADAG has an arbitrary global root, and one or several local roots. The GADAG is then converted into an almost directed acyclic graph, ADAG, by duplicating the local roots, except the arbitrary global root, virtually into two roots.

In one embodiment, the MRTs are computed by determining all possible relations between the multiple sources and the multiple destinations in the ADAG. The relations may be determined by performing two graph traversal algorithms from each network element until ordering between all the network elements are found. When the network traffic is forwarded from two sources to two destinations, the relations may be determined by performing six graph traversal algorithms from three of the four network elements.

In one embodiment, valid path pair(s) that is/are disjoint are determined by using a contradiction and/or an ordering proof to the computed MRTs.

In one embodiment, the method additionally comprises pre-compute and store all possible path pair(s) between the multiple sources and the multiple destinations in a table. The valid path pair(s) may be determined by performing a lookup in the pre-stored table to retrieve any path pair(s) that is/are disjoint.

In one embodiment, when there are multiple acceptable path pairs, the method additionally comprises using a tie-breaking rule to deterministically select one of the acceptable path pairs.

In one embodiment, the method additionally comprises selecting which path that is to belong to which source.

According to a second aspect, there is provided a network element for implementing the method according to the first aspect. To this end, a network element for forwarding network traffic from multiple sources to multiple destinations on maximally disjoint paths by Maximally Redundant Trees, MRTs is proposed.

In one exemplary implementation, the network element comprises a processor and a memory. The memory comprises instructions which are executable by the processor, whereby the network element is operative to compute an Almost Directed Acyclic Graph, ADAG, for the network. The ADAG is a graph abstraction of the network, wherein the plurality of network elements are the vertices of the ADAG and links connecting the plurality of network elements are the directed edges of the ADAG. The ADAG has an arbitrary root. The network element is operative to compute next hops along MRTs using the ADAG. The network element is operative to determine valid path pair(s) of the computed MRTs that is/are disjoint. The network element is then operative to forward network traffic using the valid path pair(s) of the MRTs.

In one embodiment, when the graph abstraction of the network is a non-2-connected graph, the memory of the network element comprises instructions executable by said processor whereby the network element is further operative to compute the ADAG for the network by compute a generalized almost directed acyclic graph, GADAG, for the network. The GADAG is a graph abstraction of the network, wherein the plurality of network elements are the vertices of the GADAG and links connecting the plurality of network elements are the directed edges of the GADAG. The GADAG has an arbitrary global root, and one or several local roots. The network element is operative to convert the GADAG into an almost directed acyclic graph, ADAG, by duplicating the local roots, except the arbitrary global root, virtually into two roots.

In one embodiment, the memory of the network element comprises instructions executable by said processor whereby the network element is further operative to compute the MRTs by determine all possible relations between the multiple sources and the multiple destinations in the ADAG. The network element may be further operative to determine the relations by performing two graph traversal algorithms from each network element until ordering between all network elements are found. When the network traffic is forwarded from two sources to two destinations, the memory may comprise instructions executable by the processor whereby the network element is further operative to determine the relations by performing six graph traversal algorithms from three of the four network elements.

In one embodiment, the memory of the network element comprises instructions executable by said processor whereby the network element is further operative to determine valid path pair(s) that is/are disjoint by using a contradiction and/or an ordering proof to the computed MRTs.

In one embodiment, the memory of the network element comprises instructions executable by said processor whereby the network element is further operative to pre-compute and store all valid possible path pair(s) between the multiple sources and the multiple destinations in a table. The network element may be further operative to determine valid path pair(s) by performing a lookup in the pre-stored table to retrieve any path pair(s) that is/are disjoint.

In one embodiment, when there are multiple acceptable path pairs, the memory of the network element comprises instructions executable by said processor whereby the network element is further operative to use a tie-breaking rule to select one of the acceptable path pairs deterministically when there are multiple acceptable path pairs.

In one embodiment, the memory of the network element comprises instructions executable by said processor whereby the network element is further operative to select which path that is to belong to which source.

According to a third aspect, there is provided a network element of a network. The network element is adapted to compute an almost directed acyclic graph, ADAG, for the network. The ADAG is a graph abstraction of the network. The plurality of network elements are the vertices of the ADAG and links connecting the plurality of network elements are the directed edges of the ADAG. The ADAG has an arbitrary root. The network element is further adapted to compute next hops along maximally redundant trees, MRTs, using the ADAG. The network element is further adapted to determine valid path pair(s) of the computed MRTs that is/are disjoint. The network element is then further adapted to forward network traffic using the valid path pair(s) of the MRTs.

According to a fourth aspect, there is provided a network element of a network. The network element comprises means adapted to compute an almost directed acyclic graph, ADAG, for the network. The ADAG is a graph abstraction of the network, wherein the plurality of network elements are the vertices of the ADAG and links connecting the plurality of network elements are the directed edges of the ADAG. The ADAG has an arbitrary root. The network element further comprises means adapted to compute next hops along maximally redundant trees, MRTs, using the ADAG. The network element further comprises means adapted to determine valid path pair(s) of the computed MRTs that is/are disjoint. The network element further comprises means adapted to forward network traffic using the valid path pair(s) of the MRTs.

According to a fifth aspect, there is provided a network element of a network. The network element comprises a first module configured to compute an almost directed acyclic graph, ADAG, for the network. The ADAG is a graph abstraction of the network, wherein the plurality of network elements are the vertices of the ADAG and links connecting the plurality of network elements are the directed edges of the ADAG and wherein the ADAG has an arbitrary root. The network element further comprises a second module configured to compute next hops along maximally redundant trees, MRTs, using the ADAG. The network element further comprises a third module configured to determine valid path pair(s) of the computed MRTs that is/are disjoint. The network element further comprises a fourth module configured to forward network traffic using the MRTs.

According to a sixth aspect, there is provided a computer program comprising instructions which, when executed on at least one processor, cause the at least one processor to carry out the method according to the first aspect.

According to a seventh aspect, there is provided a carrier comprising the computer program of the third aspect, wherein the carrier is one of an electronic signal, optical signal, radio signal, or computer readable storage medium.

The various proposed embodiments herein may allow forwarding of network traffic from multiple sources to multiple destinations on maximally disjoint paths by MRTs. The benefit of using address-based routing is that only the sources need to be aware of these disjoint paths, the other nodes just install the MRTs next hops. Only the sources generally need to know the correct tree since they mark the packets using e.g. the correct IP address.

BRIEF DESCRIPTION OF THE DRAWINGS

Various aspects of the present invention will now be described, by way of example, based on embodiments with reference to the accompanying drawings, wherein:

FIG. 12b shows an updated graph of FIG. 12a;

DETAILED DESCRIPTION

Figure 1:
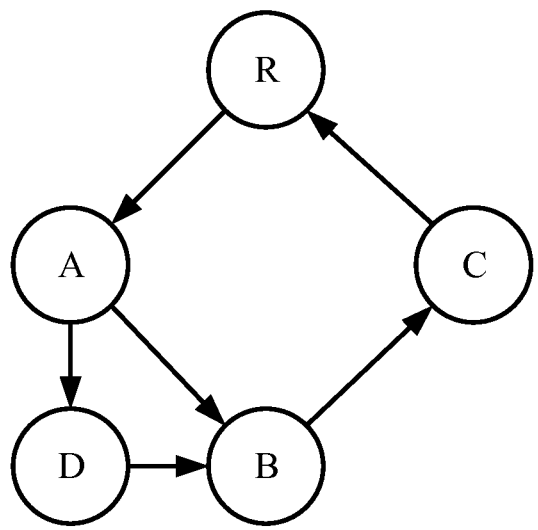
FIG. 1 shows an ADAG which is a directed graph with a single root node.
Figure 2:
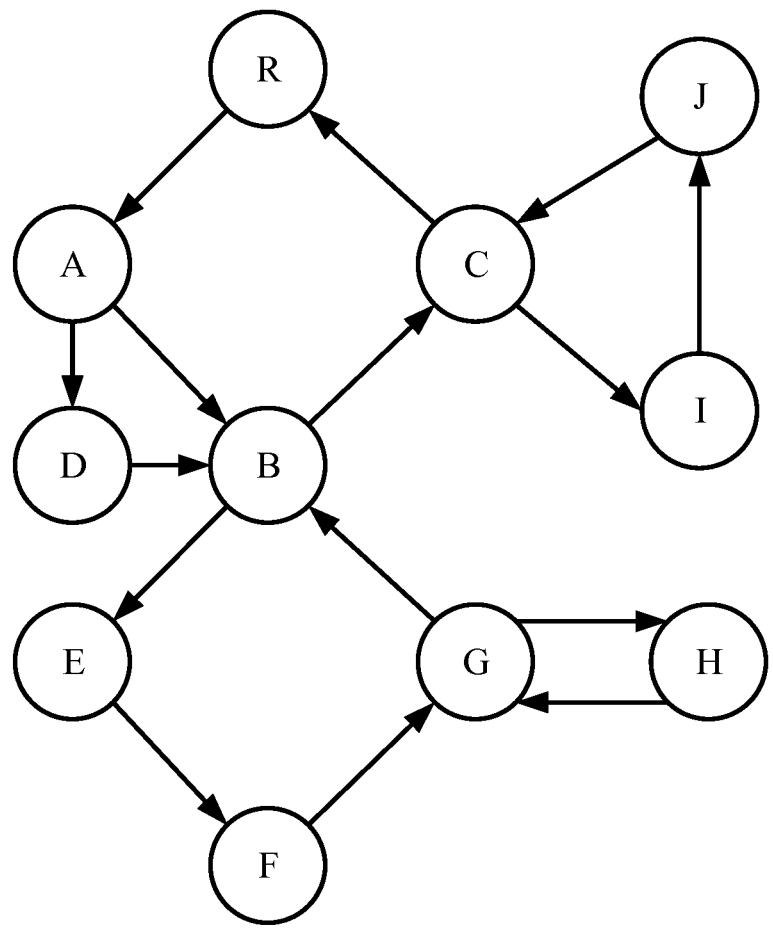
FIG. 2 shows an example graph and its spanning GADAG with global root R.
Figure 3:
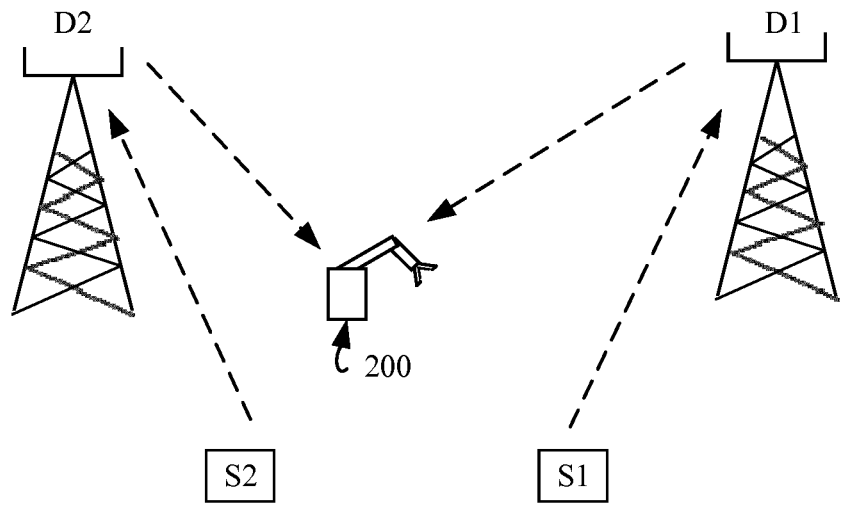
FIG. 3 illustrates an entity that is remotely controlled, such as a robot e.g. in a factory.

Embodiments herein will be described more fully hereinafter with reference to the accompanying drawings, in which advantageous embodiments are shown. These embodiments may, however, be embodied in many different forms and should not be construed as limited to the embodiments explicitly set forth herein. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling circuit of a general purpose computer, special purpose computer, and/or other programmable data processing apparatus to produce a machine, such that the instructions, which execute via the processor of the computer and/or other programmable data processing apparatus, create means for implementing the functions or acts specified in the block diagrams and/or flowchart block or blocks.

Accordingly, the present disclosure may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may comprise, store, communicate, propagate, or transport the program for use by or in connection with the instruction execution system, apparatus, or device.

Although specific terms in some specifications are used here, such as base station, it should be understand that the embodiments are not limited to those specific terms but may be applied to all similar entities, such as macro base station, femto base stations, NodeB, eNodeB and Core Network (CN).

As used herein, a network element (e.g., a router or a switch) is a piece of networking equipment, including hardware and software that communicatively interconnects other equipment on the network (e.g., other network elements, end systems). A network element is generally identified by its media access control (MAC) address, Internet protocol (IP) address/subnet, network sockets/ports, and/or upper OSI layer identifiers.

Network elements are commonly organized and separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols that communicate with other network elements to exchange routes and select those routes based on one or more routing metrics. In addition, the control plane may also typically includes ISO layer 2 control protocols.

Routes and adjacencies may be stored in one or more routing structures on the control plane. The control plane may program the data plane with information based on the routing structure(s). For example, the control plane programs adjacency and route information into one or more forwarding structures on the data plane. The data plane uses these forwarding and adjacency structures when forwarding traffic.

Typically, a network element includes a set of one or more line cards, a set of one or more control cards, and optionally a set of one or more service cards (sometimes referred to as resource cards). These cards can be coupled together through one or more interconnect mechanisms. The set of line cards can make up the data plane, while the set of control cards may provide the control plane and exchange packets with external network elements through the line cards. The set of service cards can provide specialized processing.

Nodes may be implemented in network elements. A physical node may be implemented directly on the network element, whereas a virtual node may be a software, and possibly hardware, abstraction implemented on the network element. Thus, multiple virtual nodes may be implemented on a single network element.

In one of its aspects, the technology presented herein concerns a method for forwarding network traffic from multiple sources to multiple destinations on maximally disjoint paths by maximally redundant trees, MRTs. The method is implemented in a network element 900 implementing multipoint-to-multipoint functionalities in a path computation element, PCE, of a network, wherein the network comprises a plurality of network elements.

Figure 4:
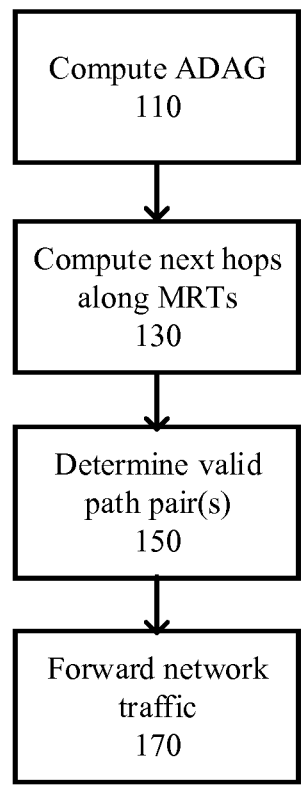
FIG. 4 is a flowchart of an example method performed by a network element.

With reference to the FIG. 4, a first embodiment will now be described. FIG. 4 illustrates a method performed by a network element 900. An almost directed acyclic graph, ADAG, is computed 110 for the network. The ADAG is a graph abstraction of the network, wherein the plurality of network elements are the vertices of the ADAG and the links connecting the plurality of network elements are the directed edges of the ADAG. The ADAG has an arbitrary root.

The ADAG is used to compute 130 the next hops along MRTs using the known MRT computing method described above. The MRT computing method is further described in RFC7811 and RFC7812.

Thereafter, one or more valid path pair(s) of the computed MRTs that is/are disjoint is/are determined 150. Only those path pair(s) that is/are disjoint are determined to be valid. When there are multiple sources and multiple destinations, there may be several possible path pairs. However, not all of them are disjoint, but at least one pair is always disjoint. Hence, the path pair(s) that are disjoint is/are determined and accordingly valid. Only the path pair(s) that does not comprise contradictions is valid.

Finally, when the valid path pair(s) of the computed MRTs that is/are disjoint has/have been determined, the network traffic is forwarded 170 by using the valid path pair(s) of the MRT(s).

Unlike the method described in RFC7811, which describes a way for finding MRTs rooted at each node and a way of using these MRTs for finding two disjoint paths between any single source and single destination, the proposed method discloses a further developed method that may use MRTs to find disjoint paths between multiple sources and multiple destinations. Accordingly, a solution for providing redundancy in a multisource-to-multi-destination system with address-based routing is provided. As the proposed method allows multisource-to-multi-destination systems to find and use disjoint paths, improved redundancy, and accordingly safer systems, can be achieved. The risk of unavailability due to network failures may be reduced and the time that the system may be down due to network failures may accordingly also be reduced. Consequently, higher profitability and reliability may be achieved.

In one exemplary embodiment, the network traffic may be forwarded from two sources to two destinations. One example of such use case were previously described, i.e. when the sources/destinations may be movable and an entity may be remotely controlled. In order for such system to be provided with 1+1 protection for all components of the system, the system may comprise two separate radio connections, probably on different frequencies, using two different base stations D1, D2 with overlapping coverage. Thus, the system may comprise two sources (the controllers S1, S2) and two destinations (the base stations D1, D2). Accordingly, by applying the proposed method, the described use case is made possible.

Some embodiments, will hereinafter be described with reference to FIG. 5. In some embodiments, the graph abstraction of the network is a non-2-connected graph. In these embodiments, the step of computing 130 the MRTs with the known method from RFC7811 is not directly applicable because of a special corner case. An illustrative example of a graph that is not two connected is shown in FIG. 6. The graph is a non-2-connected graph as node I is needed in any path from the top part to the bottom part or vice versa. Accordingly, node I is a cut-vertex. The graph comprises two sub-graphs. The upper sub-graph comprises nodes I, G, P, H, Q and R, and the lower sub-graph comprises nodes I, J, K, A and B. However, these sub-graphs are 2-connected.

For non-2-connected graphs, there are no ADAGs. Instead, there are Generalized Almost Directed Acyclic Graphs, GADAGs. The GADAG illustrated in FIG. 6 is rooted in R, the two sources are A and B, and the two destinations are P, Q. Accordingly, the two destinations P and Q are in another block than the two sources A and B. By using the method known from existing art, for example RFC7811, the paths may be selected such that the blue paths are the blue paths to I, the cut-vertex towards them, and then the blue from I to P and Q, while the red paths are the red path to I and the red path from I to P and Q.

Although it may be possible to select which source that sends packets to which destination, in this example A have to use the red tree, and B have to use the blue tree, otherwise the two paths would not be disjoint even to node I. The challenge is that P is not ordered with I but Q is ordered. Thus, from I the blue next hop to P and the red next hop to Q would both be G, while the red next hop to P and the blue to Q are both H. The difficulty occurs because nodes in other blocks do not differentiate between nodes ordered or not ordered with the cut-vertex they use. In one of the embodiments disclosed herein, this challenge can solved by developing the way nodes compute MRTs from a GADAG.

In this embodiment, when the graph abstraction is a non-2-connected graph, a generalized almost directed acyclic graph, GADAG, is computed 115 for the network. The spanning GADAG is calculated in the same way as with the known method described in RFC7811. Accordingly, the plurality of network elements are the vertices of the GADAG and the links connecting the plurality of network elements are the directed edges of the GADAG. The GADAG has an arbitrary global root, and one or several local roots.

Thereafter, the GADAG is converted 120 into an almost directed acyclic graph, ADAG, by duplicating the local roots, except the arbitrary global root, virtually into two roots. Thereafter, an edge between the duplicated local root, may be added to the GADAG. For each node X in the block where L is not the local root, edge X→L⁻ or L⁺→X may be added, where there was edge X→L or L→X in the original GADAG, respectively. For node Y in a block with local root L add edge L⁻→Y or Y→L⁺, if there was edge L→Y or Y→L, respectively. Hence, the GADAG is converted into an ADAG. Thereafter, the next hops along MRTs is computed 130 by using the method in RFC7811 on this ADAG. By using the previously described method, a valid ADAG is always constructed and hence, the paths, aside from the cut-vertices, are guaranteed to be disjoint.

Figure 6:
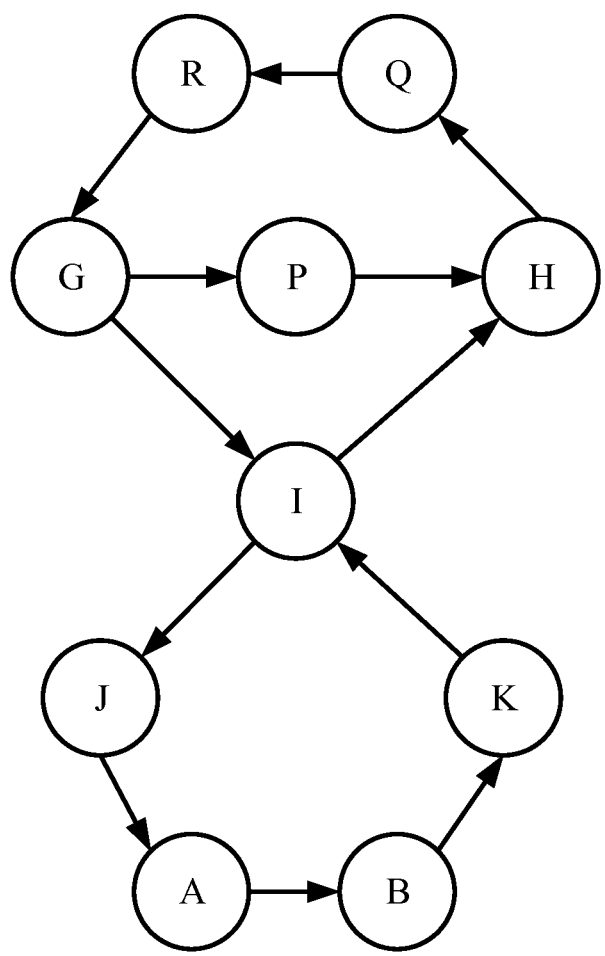
FIG. 6 illustrates a non-2-connected graph with two sub-graphs.
Figure 7:
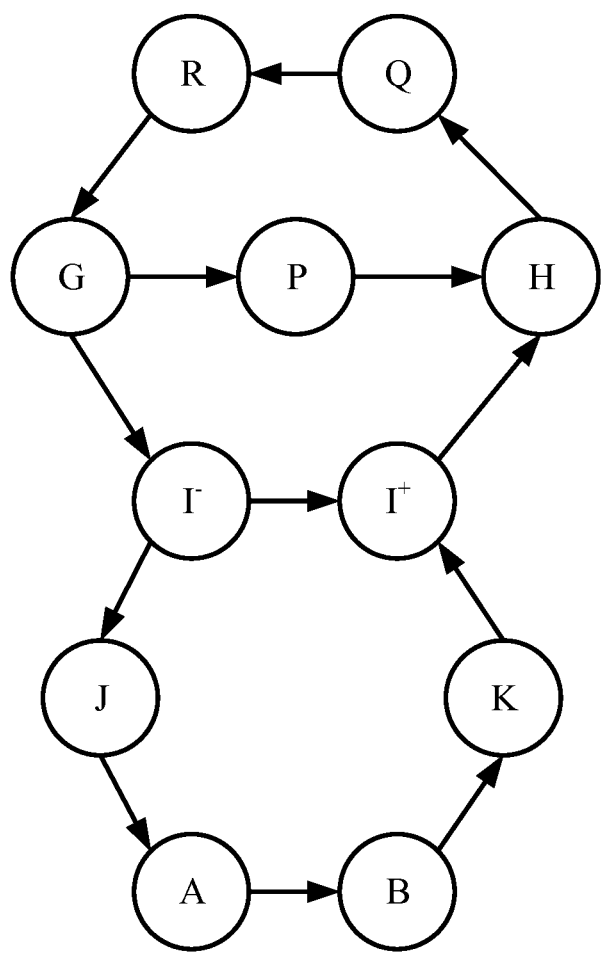
FIG. 7 shows an ADAG version of FIG. 6.

The previously described method may be applied to the GADAG illustrated in FIG. 6. FIG. 7 shows the resulting ADAG version. The local root I is split into two, I⁻ and I⁺ and the edges between the nodes are added as previously described.

By providing a method that may be capable of calculating a GADAG for a network and then converting the GADAG into an ADAG, it may be possible to use the described method also at non-2-connected networks. Accordingly, it may be possible to provide redundancy also for networks that are not 2-connected, for example due to a network failure. Hence, an even more useful method can provided, which may continue to provide redundancy in multisource-to-multi-destination systems with address-based routing. Consequently, safer systems may be achieved, the risk of unavailability due to network failures may be further reduced and the time that the system may be down due to network failures may accordingly be further reduced. Consequently, higher reliability can be achieved.

In one embodiment, the MRTs are computed 130 by determining 140 all possible relations between the multiple sources and the multiple destinations in the ADAG. As also previously described, the ordering between any two nodes N, M may take three possible states: N can be lesser or greater than M, or N and M can be unordered (N<M, N>M or N $\not\lessgtr$ M). Assume, for the sake of simplicity, that there may be four nodes A, B, P and Q, where A and B may be sources and P and Q may be destinations. As four nodes may form 6 pairs (A and B; A and P; A and Q; B and P; B and Q; and P and Q), there are $3^6$=729 possible cases.

In one embodiment, in order to find out the ordering between all the nodes, two graph traversals are performed from each network element until ordering between all the network elements are found. A graph traversal refers to the process of visiting (updating or checking) each vertex in a graph. The graph traversals may be used to find the nodes definitely lesser and definitely greater than it.

In the exemplary embodiment previously described, when network traffic may be forwarded from two sources to two destinations, the relations may be determined by performing sex graph traversal algorithms from three of the four network elements. I.e. in order to find the relations between all the four nodes, the two sources and the two destinations, 3*2=6 graph traversals are needed. No graph traversals may be needed from the fourth node, since if A<B, B>A follows. The graph traversal may for example be the shortest path first (SPF), breath first search (BFS) or depth first search (DFS). Depending on the situation, the most suitable graph traversal may be chosen.

Figure 5:
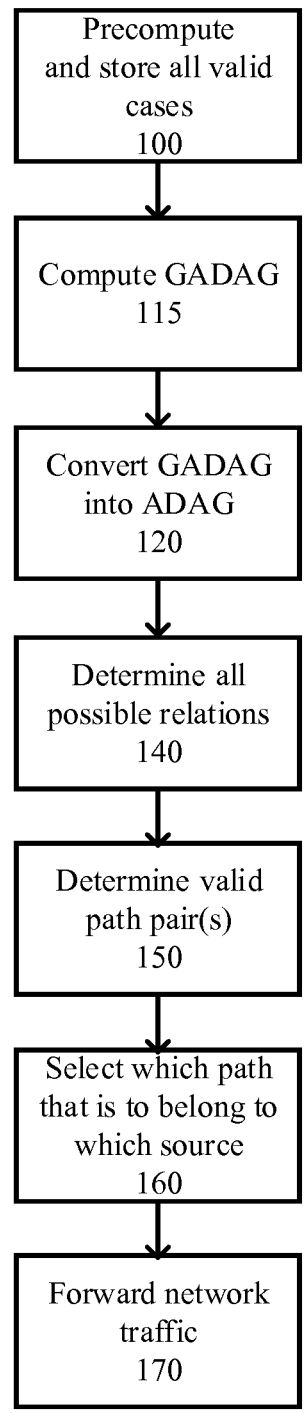
FIG. 5 is a flowchart of a further example method performed by a network element.

In some embodiments, with reference to FIG. 5, the valid path pair(s) that is/are disjoint are determined 150 by using a contradiction and/or an ordering proof to the computed MRTs. In one embodiment, both the contradiction and ordering proof is used. In another embodiment, only the contradiction proof is used. In still another embodiment, only the ordering proof is used.

The method of performing the contradiction proof, is to make an assumption and prove that the assumption is wrong, which accordingly implies that the path pair is disjoint. The contradiction proof indirectly supposes that the paths are not disjoint, i.e. that there is at least one node N, which is common. Thus, the contradiction proof assumes that there are some more orderings Those orderings may cause self-contradiction. The self-contradiction is either a cycle in the relations, i.e. A<B and A>B at the same time, or that two unordered nodes become ordered, i.e. A<B, while A was not ordered with B by the initial assumption. Accordingly, if this is the case, the assumption that the paths comprise a common node is false and hence, the path pair is disjoint. Consequently, by using the contradiction proof, it may be proved that no common node exists on the paths and that the path pair is disjoint.

The method of performing the ordering proof use the computed MRTs. If there are two paths A->P (A<P) and B->Q (B<Q) and it is known that P<B, then no node N can exist which is in both the paths. Both A<N<P and B<N<Q cannot be true. Accordingly, nodes in interval [A,P] must be lower than all the nodes in interval [B,Q]. Consequently, by using the ordering proof, it may be proved that the nodes in both the paths are ordered and that the path pair is disjoint.

By determining valid path pair(s) that is/are disjoint by using the contradiction and/or the ordering proof to the computed MRTs, the one or more path pairs which are disjoint may always be found. It is possible to, in a reliable way, determine which path pair(s) that is/are disjoint between multiple sources and multiple destinations.

In one of its exemplary embodiments, the method additionally comprises pre-compute and store 100 all possible path pair(s) between the multiple sources and the multiple destinations in a table. The valid path pair(s) may then be determined 150 by performing a lookup in the pre-stored table to retrieve any path pair(s) that is/are disjoint. Accordingly, when a solution is needed in the real world, the relations in the network is found and then a lookup is performed in the pre-stored table. By pre-computing and storing 100 all possible path pair(s) between the multiple sources and the multiple destinations in a table beforehand, less computational resources is needed on-the-fly, as the computations are already performed. In some embodiments, the determination 150 of the valid path pair(s) may be quicker than if they are not pre-computed as the valid path pair(s) are received directly from the table.

Sometimes, it is determined that there are multiple acceptable path pairs. In these cases, the method may additionally comprise using a tie-breaking rule to deterministically select one of the acceptable path pairs. This tie-breaking rule may take other optimization considerations into account. Accordingly, by allowing the method to use a tie-breaking rule, it is possible to optimize the method to current conditions which will make the method more dynamic and customizable.

In one embodiment, the method additionally comprises selecting which path that is to belong to which source. Accordingly, a dynamic method is achieved which is possible to take current conditions into consideration when network traffic is to be forwarded.

All the disclosed embodiments of the method generally may require support from all the nodes in the network doing path calculation, which means change to existing equipment. In a Software-Defined Network (SDN), this may be simple, since there is one, or a few nodes, the controllers, that need to be changed.

For distributed networks, where each node has its own control plane software, there may be a way for the nodes to negotiate the MRT computing method. If all the nodes support the proposed method, they can use it. RFC7812 and 802.1Qca typically supports MRT profiles, which comprise the MRT computation method's identifier, thus adding new MRT method variants is possible.

However, if a network comprises a node that cannot perform this proposed method, a workaround may be used. Note that the problem only arises when the two paths use at least two common blocks, and they enter to their final common block through a cut-vertex, which is not the local root and which is ordered with exactly one of the destinations in that block. This final cut-vertex may recognize the problem, if it supports the multisource-to-multi-destination use case, and put all the packets from the blue tree to the red and vice versa for those destinations, which it is not ordered with.

There is a control plane based similar solution, to change the link state advertisements at the cut-vertex. As there is no other path, all the control plane messages have to go through the same cut-vertex. If the cut-vertex swaps the numbers (addresses) belonging to the red and the blue trees for the destination it is not ordered with, the previous swapping will be done by the sources. In this case only the cut vertex need to be changed.

If the final cut-vertex does not support the multisource-to-multi-destination use-case, tunneling may be used. A source recognizing the corner case may encapsulate its packets, and set the cut-vertex as the destination of the outer packet. The cut-vertex receives the packet, decapsulates it, and the packet may continue its path along the right tree.

There is a special situation for 802.1Qca, when a central entity is computing the GADAG, and the remaining nodes use that GADAG for selecting the next hops along the trees. This central entity may convert the GADAG into an ADAG, and send it out. This also means that a pseudo node is needed to be added to the network, but it is solvable.

According to a second aspect, there is provided a network element for implementing the method according to the first aspect. To this end, a network element for forwarding network traffic from multiple sources to multiple destinations on maximally disjoint paths by Maximally Redundant Trees, MRTs is proposed.

Figure 8:
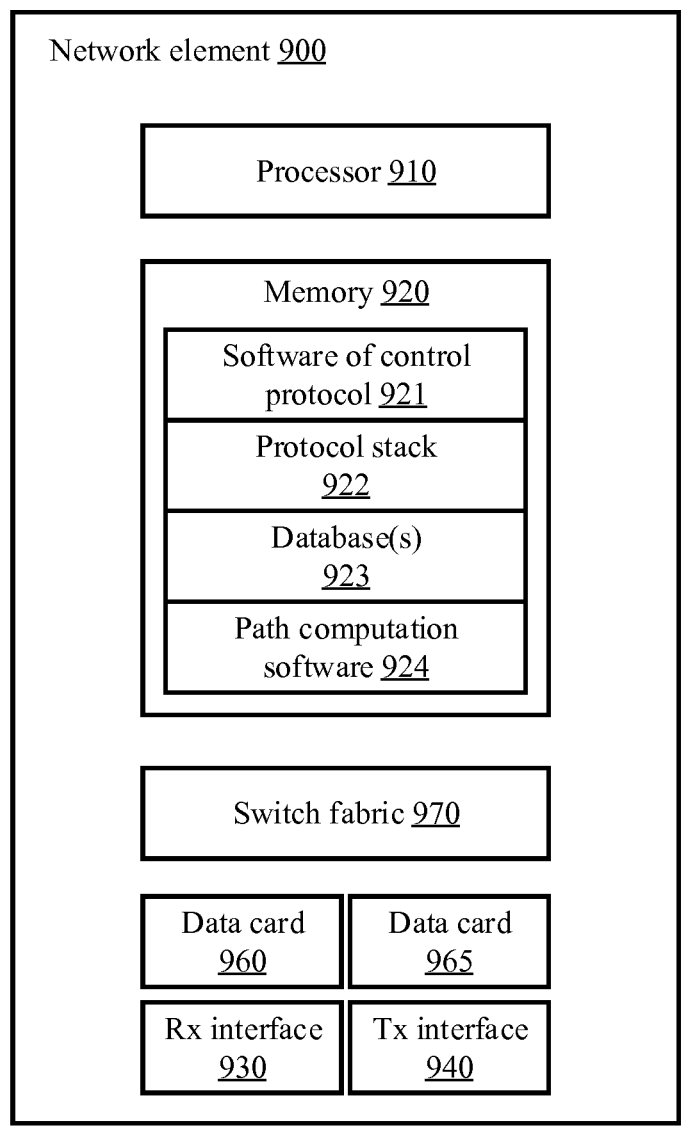
FIG. 8 shows an example implementation of a network element.

FIG. 8 discloses an example implementation of a network element 900, which is configured to perform the above-mentioned method. To this end, a network element for forwarding network traffic from multiple sources to multiple destinations on maximally disjoint paths by Maximally Redundant Trees, MRTs is proposed. The network element comprises a processor 910 and a memory 920. The network element 900 may host path computation software 924 as instructions within the memory 920 and may functioning as a network node and as a path computation element, PCE. The memory 920 may comprise instructions which are executable by the processor 910, whereby the network element 900 is operative to: compute an Almost Directed Acyclic Graph, ADAG, for the network, wherein the ADAG is a graph abstraction of the network. The plurality of network elements are the vertices of the ADAG and links connecting the plurality of network elements are the directed edges of the ADAG. The ADAG has an arbitrary root. The memory 920 may further comprise instructions which are executable by the processor 910, whereby the network element 900 is operative to compute next hops along MRTs using the ADAG. The memory 920 may further comprise instructions which are executable by the processor 910, whereby the network element 900 is operative to determine valid path pair(s) of the computed MRTs that is/are disjoint. The memory 920 may further comprise instructions which are executable by the processor 910, whereby the network element 900 then is operative to forward network traffic using the valid path pair(s) of the MRTs.

The network element 900 may include a data plane including a switching fabric 970, a number of data cards 960, 665, at least a receiver (Rx) interface 930 and at least a transmitter (Tx) interface 940. The Rx and Tx interfaces 930 and 940 interface with links on the network, the data cards 960 and 965 perform functions on data received over the interfaces 930 and 940, and the switching fabric 970 switches data between the data cards 960, 965 and/or other input/output (I/O) cards. The network element 900 may also include a control plane, which may include one or more processors 910 comprising control logic configured to forward network traffic.

In some embodiments, the graph abstraction of the network is a non-2-connected graph. In these embodiments, the memory 920 comprises instructions executable by said processor 910, whereby said network element is further operative to compute the ADAG for the network by compute a Generalized Almost Directed Acyclic Graph, GADAG, for the network, and then convert the GADAG into an Almost Directed Acyclic Graph, ADAG, by duplicating the local roots, except the arbitrary global root, virtually into two roots. The GADAG is a graph abstraction of the network, wherein the plurality of network elements are the vertices of the GADAG and links connecting the plurality of network elements are the directed edges of the GADAG and wherein the GADAG has an arbitrary global root, and one or several local roots.

In one embodiment, the memory 920 comprises instructions executable by the processor 910, whereby said network element 900 is further operative to compute the MRTs by determine all possible relations between the multiple sources and the multiple destinations in the ADAG. The network element may be further operative to determine the relations by performing two graph traversal algorithms from each network element until ordering between all network elements are found.

In the exemplary embodiment previously described, when network traffic is forwarded from two sources to two destinations, the memory 920 comprises instructions executable by the processor 910, whereby the network element 900 is further operative to determine the relations by performing six graph traversal algorithms from three of the four network elements.

In some embodiment, the memory 920 within the network node 900 comprises instructions executable by the processor 910, whereby the network element 900 is further operative to determine valid path pair(s) that is/are disjoint by using a contradiction and/or an ordering proof to the computed MRTs. In one embodiment, both the contradiction and ordering proof is used. In another embodiment, only the contradiction proof is used. In still another embodiment, only the ordering proof is used.

In one of its exemplary embodiments, the memory 920 comprises instructions executable by the processor 910, whereby the network element 900 is further operative to precompute and store all valid possible path pair(s) between the multiple sources and the multiple destinations in a table within at least one of the database 923 within the memory 920 of the network node 900. The network element 900 may then be further operative to determine valid path pair(s) by performing a lookup in the pre-stored table to retrieve any path pair(s) that is/are disjoint.

Sometimes, the network element 900 determines that there are multiple acceptable path pairs. The memory 920 comprises instructions executable by the processor 910, whereby the network element 900 is further operative to use a tie-breaking rule to select one of the acceptable path pairs deterministically when there are multiple acceptable path pairs.

In one embodiment, the network element 900 is further operative to select which path that is to belong to which source. Accordingly, the network node 900 may take current conditions into consideration when network traffic is to be forwarded.

Figure 9:
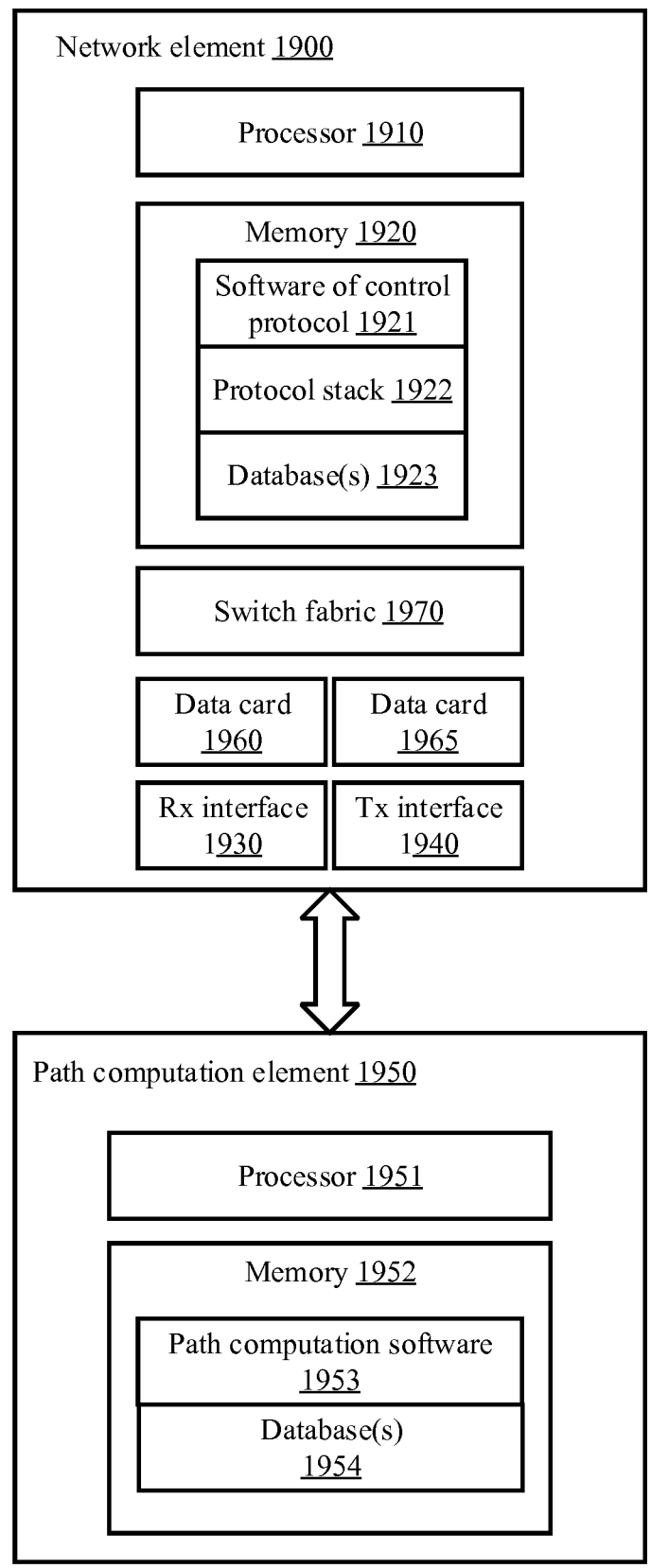
FIG. 9 shows a further example implementation of a network element.

FIG. 9 is a block diagram illustrating two network elements implementing methods for forwarding network traffic from multiple sources to multiple destinations on maximally disjoint paths by MRTs according to one embodiment of the invention. The two network elements may include a network element 1900 functioning as a network node and another network element functioning as a path computation element, PCE, 1950. As illustrated, there may be communication between the network element 1900 and the PCE 1950. The network element 1900 illustrated in FIG. 9 includes a data plane and a control plane. The data plane may include a switching fabric 1970, a number of data cards 1960, 1970, at least a receiver (Rx) interface 1930 and at least a transmitter Tx interface 1940. The Rx and Tx interfaces 1930 and 1940 may interface with links on the network. The data cards 1960 and 1970 may perform functions on data received over the interfaces 1930, 1940. The switching fabric 1970 switches data between the data cards and similar I/O cards. The network element 1900 may also include a control plane, which includes one or more processors 1910 comprising control logic configured to forward network traffic from multiple sources to multiple destinations on maximally disjoint paths by MRTs.

Other processes may be implemented in the control logic as well. The network element 1900 may further include a memory 1920, which may store software, and one or more databases 1923. The protocol stack 1922 may store methods and/or protocols implemented by the network element 1900.

The PCE 1950 coupled to a network element 1900 may include one or more processors 1951 coupled to a memory 1952. The processors 1951 may include logic to perform path computation operations and operations for the instruction of the network element 1900. The memory 1952 may include path computation software 1953 applicable for computing the ADAG and MRTs as described herein. The memory 1952 may include databases 1954. The databases may include a replica of the databases stored by the network element 1923 and may include further databases, e.g. for ADAG and/or MRT computations. In one embodiment, network element 1900 and PCE 1950 may be parts of a Layer 2 network, and they can be communicatively coupled with other network elements.

Figure 10:
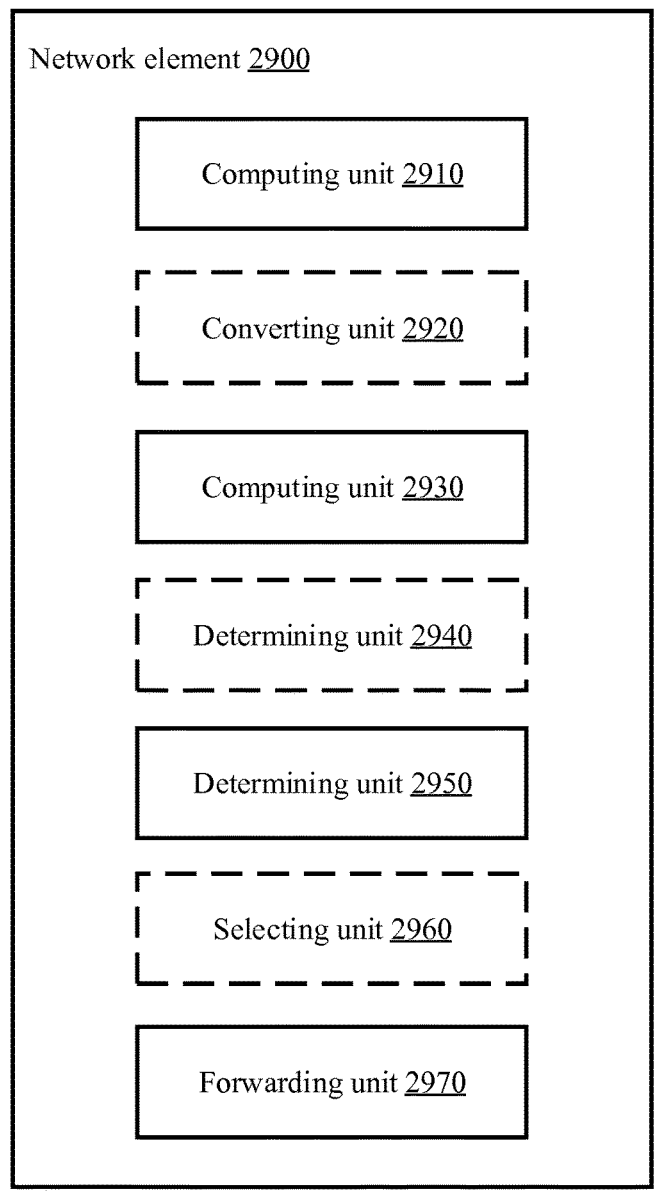
FIG. 10 shows yet a further example implementation of a network element.

FIG. 10 is a block diagram illustrating one network element according to a third, fourth and fifth aspect. According to a third aspect, the network element 2900 is adapted to implement methods for forwarding network traffic from multiple sources to multiple destinations on maximally disjoint paths by MRTs according to one embodiment of the invention. The network node 2900 is adapted to compute an almost directed acyclic graph, ADAG, for the network. The ADAG is a graph abstraction of the network, wherein the plurality of network elements are the vertices of the ADAG and links connecting the plurality of network elements are the directed edges of the ADAG. The ADAG has an arbitrary root. The network element 2900 is further adapted to compute next hops along maximally redundant trees, MRTs, using the ADAG; determine valid path pair(s) of the computed MRTs that is/are disjoint; and forward network traffic using the valid path pair(s) of the MRTs.

The network element 2900 according to FIG. 10 may serve as a network node and a PCE of a network comprising a plurality of network elements. The network element 2900 comprises a computing unit 2910, a computing unit 2930, a determining unit 2950 and a forwarding unit 2970. Optionally, the network element 2900 may additionally comprise a converting unit 2920, a determining unit 2940 and selection unit 2960.

According to a fourth aspect, the network element 2900 comprise means adapted to compute an almost directed acyclic graph, ADAG, for the network. The ADAG is a graph abstraction of the network, wherein the plurality of network elements are the vertices of the ADAG and links connecting the plurality of network elements are the directed edges of the ADAG. The ADAG has an arbitrary root. The network element 2900 further comprises means adapted to compute next hops along maximally redundant trees, MRTs, using the ADAG; means adapted to determine valid path pair(s) of the computed MRTs that is/are disjoint; and means adapted to forward network traffic using the valid path pair(s) of the MRTs.

According to a fifth aspect the computing unit 2910 of the network element 2900 is a first module configured to compute an almost directed acyclic graph, ADAG, for the network. The ADAG is a graph abstraction of the network, wherein the plurality of network elements are the vertices of the ADAG and links connecting the plurality of network elements are the directed edges of the ADAG. The ADAG has an arbitrary root. The computing unit 2930 is a second module configured to compute next hops along maximally redundant trees, MRTs, using the ADAG. The determining unit 2950 is a third module configured to determine valid path pair(s) of the computed MRTs that is/are disjoint. The forwarding unit 2970 of the network element 2900 is a fourth module configured to forward network traffic using the valid path pair(s) of the MRTs.

According to a sixth aspect, there is provided a computer program comprising instructions which, when executed on at least one processor, may cause the at least one processor to carry out the method according to the first aspect.

According to a seventh aspect, there is provided a carrier comprising the computer program of the third aspect, wherein the carrier is one of an electronic signal, optical signal, radio signal, or computer readable storage medium.

Various Detailed Implementation Alternatives

In the following, in order to facilitate the understanding of the reader, the disclosure will now be described in relation with three illustrative examples. N→M will be used for describing N<M in the following and N→M will also be used where it makes understanding simpler. The second notation shows that a relation describes a path in the original ADAG, accordingly, the same notation will be used for describing the path N→M too.

Example Case 1

The disclosed method will be described herein below in conjunction with an example. In this case, the network is 2-connected and none of the two sources and the two destinations are the root of the ADAG.

A and B are the two sources, and P and Q are the two destinations. Assume that A prefers to use P and B prefers to use Q, however, sometimes it may be needed to swap the destinations in order to provide disjoint paths.

As described above, with four nodes, there can be ordering between any two of them, which is defined by the ADAG of the network. Therefore, the relation between any two N, M nodes can take three states: N can be lesser or greater than M, or N and M can be unordered; N<M, N>M or N ≸ M. Four nodes may form 6 pairs and accordingly, there are $3^6=729$ cases. Most of these cases are self-contradictory, but however, there are still 219 valid cases. In order to find the most complete solution, all these cases have to be checked and a proof for each of them has to found one-by-one.

Figure 11:
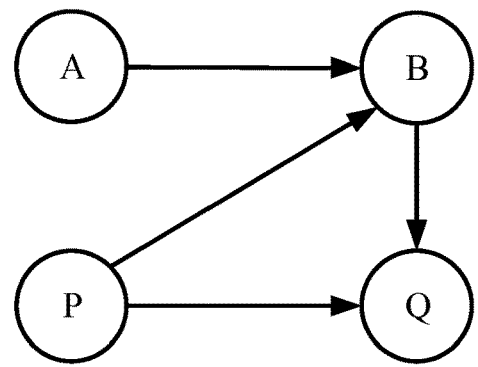
FIG. 11 shows an example DAG.

An example is illustrated with reference to FIG. 11. In FIG. 11, A is smaller than B, A is unordered with P and Q, B is greater than P and smaller than Q, and P is smaller than Q. Accordingly, A<B, A ≸ P, A ≸ Q, B>P, B<Q and P<Q. For unordered node pairs, edges has explicitly not been drawn.

It may be possible that this is an invalid configuration, hence, it is first checked for self-contradiction. Ordering relations are transitive, i.e. A<B and B<Q implies that A<Q, i.e. if there is a path from A to Q, A<Q. In order to find self-contradiction, first all the relations are found by performing, e.g. a Breadth-First Search (BFS) from each node. Consequently, it was found that A<Q, but as M ≸ Q initially, this implies that FIG. 11 is an invalid configuration.

Figure 12A:
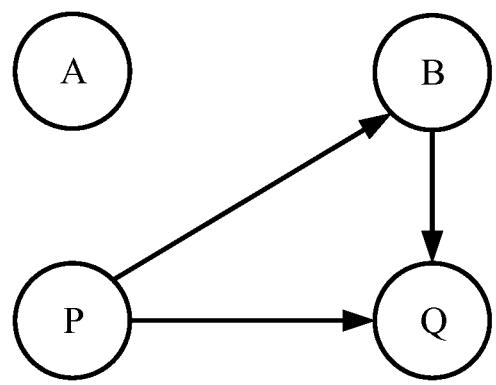
FIG. 12a shows a further example DAG.

A similar, but valid configuration is illustrated in FIG. 12a. In FIG. 12a, A is unordered with B, A is unordered with P, A is unordered with Q, B is greater than P and smaller than Q, and P is smaller than Q. Accordingly, M B, M P, M Q, B>P, B<Q, and P<Q.

Figure 12B:
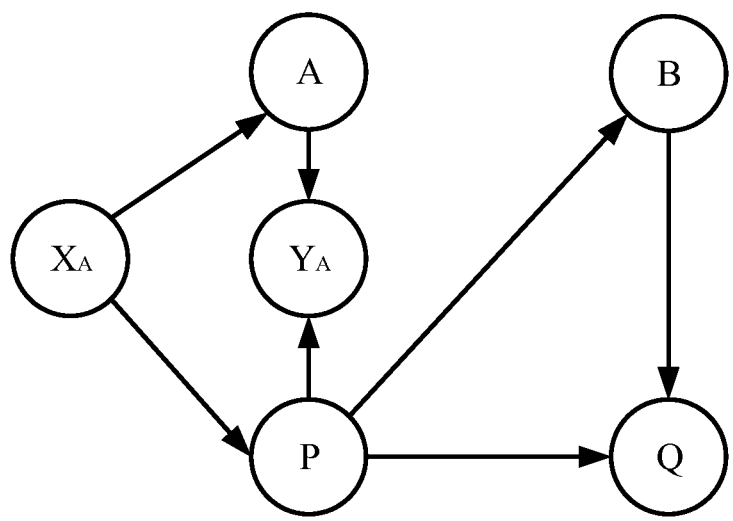

As A and P are not ordered with each other, the path from A to P along the two trees will use rule #3 described in the background, i.e. the blue path decreases until it gets to a node XA, which is lesser than P and the red path increases until it gets to a node YA, which is greater than P. These nodes and the relations belonging to them are added to the graph, as also illustrated in FIG. 12b. In fact, the illustration in FIG. 12b would be formally complete if also the relations $X_A<Q$ or $X_A<Y_A$ were added, but as these relations are not important in this illustrative example and would make the figure overcomplicated, they are left out.

In order to prove that the blue path from A to P and the blue path from B to Q are disjoint, the ordering and contradiction proof is used. The blue path A to P is path $A→X_A+X_A→P$ and the blue path from B to Q is the B→Q increasing path.

With the contradiction proof, it is first proved that path $A→X_A$ is disjoint with B→Q. According to the contradiction proof, indirectly suppose that this is not the case, i.e. that there is some node N for what $X_A<N<A$, N is on a $X_A→A$ directed path, and B<N<Q, N is on the B→Q directed path. If that was true, this implies that $X_A<Q$ and B<A. However, as A ≸ B was the initial assumption, no such N can exist. Accordingly, the contradiction proof determines that the paths are disjoint.

With the ordering proof, it is shown that path $X_A→P$ and B→Q are disjoint. Since all the nodes in path $X_A→P$ are in interval $[X_A, P]$ and all the nodes in path B→Q are in interval [B, Q] and P<B, these two paths must be node-disjoint. Accordingly, the ordering proof determines that the paths are disjoint.

In general, the algorithm takes the initial 6 orderings between the two sources and the two destinations. If A and P are unordered, $X_A$ and $Y_A$ are added to these nodes and ordering $A>X_A$, $P>X_A$, $A<Y_A$, $P<Y_A$. Similarly, if B and Q are unordered $X_B$ and $Y_B$ and ordering $B>X_B$, $Q>X_B$, $B<Y_B$, $Q<Y_B$ are added. The computed graph/set of relations is just a part of the spanning ADAG of a network. Accordingly, for the general algorithm add the root node to the relations. Normally, the root is both the greatest and the smallest node, but this would introduce some corner cases to our proving, so it is simpler to virtually split the root node into Rmin and Rmax, add these two nodes to the previous ones and for each node N have the relations Rmin<N and N<Rmax.

When all the needed nodes and relations are added, the set of relations is extended as previously described: if for any node N<M and M<K, add relation N<K. This may be performed, e.g., by a BFS. If a relation is formed between nodes, which are unordered with respect to the original 6 relations, or if for some node pair N, M, N<M at the same time as N>M, the input case is not valid. By checking all the 729 cases, it is found that 219 of them are valid.

When the input case is valid, the blue and the red paths from A to P and B to Q are as follows; disjoint property for these subpaths has to be checked:

For A and P:
1. If A<P:
   AP blue=A→P
   AP_red=Rmin→A, P→Rmax
2. If A>P:
   AP blue=A→Rmax, Rmin→P
   AP_red=P→A
3. If A ≸ P:
   AP blue=$X_A$→A, $X_A$→P
   AP_red=A→$Y_A$, P→$Y_A$ Similarly, for B and Q:
1. If B<Q:
   BQ_blue=B→Q
   BQ_red=Rmin→B, Q→Rmax
2. If B>Q:
   BQ_blue=B→Rmax, Rmin→Q
   BQ_red=Q-B
3. If B ≸ Q:
   BQ_blue=$X_B$→B, $X_B$→Q
   BQ_red=B→$Y_B$, Q→$Y_B$ For example, when A<P, AP_red=Rmin→A, P→Rmax, but certainly, packets are sent along path A→R→P. The arrow is used in the other direction, since Rmin<A and P<Rmax and the relations to be checked are described.

Since both A and B have a blue and a red path, there are four possible path pairs, and all of them have to checked one by one. If some node comprises more than one relation/ subpath, each subpath is checked against each other subpath. Two paths are disjoint if all the subpaths are disjoint. As described previously, the two subpaths are determined to be disjoint by using the contradiction and the ordering proof.

As an example, consider that A>P and B>Q. In order to check whether (blue, blue) path pair is acceptable, it is needed to check if (A→Rmax, B→Rmax), (A→Rmax, Rmin→Q), (Rmin→P, B→Rmax) and (Rmin→P, Rmin→Q) subpath/relation pairs are disjoint. To decide that, the previously described contradiction and/or the ordering proof are/is used.

Example Case 2

Figure 13:
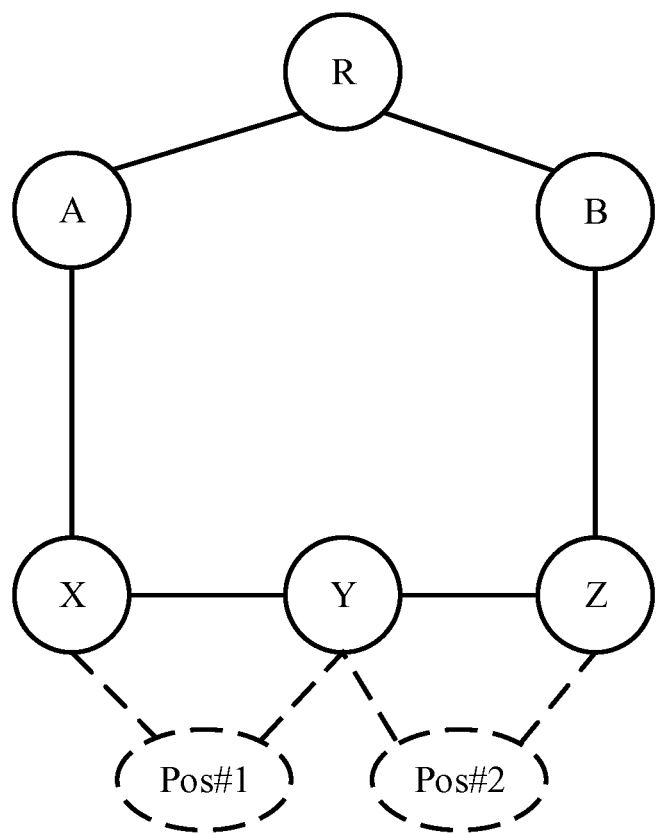
FIG. 13 illustrates a network.

Another exemplary embodiment is now described with reference to FIG. 13. FIG. 13 illustrates a network. A first controlled entity is connected to base station X and Y, such that node A send packets to X and B send packets to Y. The controlled entity is in position 1, Pos #1. However, the entity may move away to position 2, Pos #2, and loose the connection with X. Then, the entity may be reached using base station Y and Z. It would be desirable to perform a change only for A and X, but that has as consequence that it is impossible to find disjoint paths from A to Z and B to Y. Accordingly, Y and Z have to be swapped and paths from A to Y and B to Z have to be found. Note that this phenomenon is general: in some cases it is possible that it cannot be proved for any path pair that those paths are disjoint, but swapping the destinations may always help in this case.

When there are multiple acceptable path pairs, some tie-breaking rule must be used to deterministically select one from them, which may take other optimization considerations into account. Moreover, if swapping P and Q is not a problem, the "swapped" path pairs can also be selected. The only constraint is that both A and B must select the same path pair, otherwise they are not guaranteed to be disjoint.

Example Case 3

In the previous examples it was supposed that none of the two sources or the two destinations is the root of the ADAG, and there are two source and two destination nodes. It this example, considering when this is not the case.

Although for the root, it would be a valid approach to tune the previous method to simulate the paths from the root, however, this is not necessary. The root is just a node, and the previous proofs never supposed that two of the nodes in the DAG model are not the same. The only difference is that the root was represented by two nodes, Rmin and Rmax, such that it can be both the smallest and the greatest node. That is, when the root R is one of the sources, the cases when A is smaller than any other node and A is greater than any other node have to be considered. In both cases, A is ordered with all the remaining 3 nodes. Hence, the union of the possible solutions is the whole solution. When the root is one of the destinations (let it be destination P), the situation is the same: take the cases, when P is lesser and when P is greater than all the other nodes, and their union is the solution.

For completeness, consider the one-source-to-two-destinations and the two-sources-to-one-destination problem. Note that in these cases, either one of the two sources or one of the two destinations is the same node, i.e. these are degenerate cases of the main focus. The problem may be solved in the following simple way: in the ADAG, split node X into two X− and X+ nodes such that there is an edge X−→X+, all the edges going into X now go into X− and all the edges going out from X now go out from X+. If for some Y, Y≸X, let Y≸X− and Y≸X+. Note that the resulting graph will still be an ADAG, and the node has been virtually doubled. Therefore, when there is only one source or only one destination (let this be node X), virtually double it (create X+ and X−), add relation X−<X+, for any relation X<Y, add X+<Y, for any relation Y<X, add Y<X− and for any Y≸X, add Y≸X− and Y≸X+. Now, there are two sources and two destinations.

In the case when the root R is the only source or the only destination, use both tricks. First take Rmin, split it into two and find the solution for it, i.e. both resulting virtual nodes will be lower than the other nodes, and one of them will be even lower than the other one. Next take Rmax and do the same. Finally, take the union of the solutions.

The various embodiments described herein may provide several advantages. By computing an ADAG for the network, computing next hops along MRTs using that ADAG, determining one or more valid path pair(s) of the computed MRTs that is/are disjoint, and then forwarding network traffic using the valid path pair(s) of the MRTs, it is possible to forward network traffic from multiple sources to multiple destinations on maximally disjoint paths by MRTs. The benefit of using address-based routing is that only the sources need to be aware of these disjoint paths, the other nodes just install the MRTs next hops. Only the sources need to know the correct tree since they mark the packets using e.g. the correct IP address.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments.

Although the present invention has been described above with reference to specific embodiments, it is not intended to be limited to the specific form set forth herein. Consequently, the invention is limited only by the accompanying claims and other embodiments than the specific above are equally possible within the scope of the appended claims.

The invention claimed is:

1. A method for forwarding network traffic from multiple sources to multiple destinations on maximally disjoint paths by maximally redundant trees, MRTs, implemented in a network element implementing multipoint-to-multipoint functionalities in a path computation element, PCE, of a network, the network having a plurality of network elements, the method comprising:

computing, by the network element, an almost directed acyclic graph, ADAG, for the network, the ADAG being a graph abstraction of the network, the plurality of network elements being the vertices of the ADAG and links connecting the plurality of network elements are the directed edges of the ADAG, the ADAG having an arbitrary root;

computing, by the network element, next hops along MRTs using the ADAG;

determining, by the network element, at least one valid path pair of the computed MRTs that is disjoint, determining the at least one valid path pair being performed by using at least one of a contradiction and an ordering proof to the computed MRTs; and forwarding, by the network element, network traffic using the valid path pair(s) of the MRTs.

2. The method according to claim 1, wherein when the graph abstraction of the network is a non-2-connected graph, the computation of the ADAG for the network comprises:

computing, by the network element, a generalized almost directed acyclic graph, GADAG, for the network, wherein the GADAG is a graph abstraction of the network, wherein the plurality of network elements are the vertices of the GADAG and links connecting the plurality of network elements are the directed edges of the GADAG and wherein the GADAG has an arbitrary global root, and one or several local roots; and converting, by the network element, the GADAG into an almost directed acyclic graph, ADAG, by duplicating the local roots, except the arbitrary global root, virtually into two roots.

3. The method according to claim 1, wherein computing the MRTs comprises determining all possible relations between the multiple sources and the multiple destinations in the ADAG.

4. The method according to claim 3, wherein determining the relations comprises performing two graph traversal algorithms from each network element until ordering between all the network elements are found.

5. The method according to claim 3, wherein the network traffic is forwarded from two sources to two destinations and wherein the determining the relations comprises performing six graph traversal algorithms from three of the four network elements.

6. The method according to claim 1, wherein all possible path pair(s) between the multiple sources and the multiple destinations are pre-computed and stored in a table.

7. The method according to claim 6, wherein determining valid path pair(s) further comprises, performing a lookup in the pre-stored table to retrieve any path pair(s) that is/are disjoint.

8. The method according to claim 1, wherein when there are multiple acceptable path pairs, the method further comprises using a tie-breaking rule to deterministically select one of the acceptable path pairs.

9. The method according to claim 1, wherein the method further comprises, selecting, by the network element, which path that is to belong to which source.

10. A network element for forwarding network traffic from multiple sources to multiple destinations on maximally disjoint paths by maximally redundant trees, MRTs, implementing multipoint-to-multipoint functionalities in a path computation element, PCE, of a network, the network having a plurality of network elements, the network element comprising:

a processor; and a memory, the memory comprising instructions executable by the processor whereby the network element is configured to:

compute an almost directed acyclic graph, ADAG, for the network, the ADAG being a graph abstraction of the network, the plurality of network elements being the vertices of the ADAG and links connecting the plurality of network elements are the directed edges of the ADAG, the ADAG having an arbitrary root;

compute next hops along MRTs using the ADAG;

determine at least one valid path pair of the computed MRTs that is disjoint, determining the at least one valid path pair being performed by using at least one of a contradiction and an ordering proof to the computed MRTs; and forward network traffic using the valid path pair(s) of the MRTs.

11. The network element according to claim 10, wherein when the graph abstraction of the network is a non-2-connected graph, the memory comprises instructions executable by the processor whereby the network element is further operative to compute the ADAG for the network by:

compute a generalized almost directed acyclic graph, GADAG, for the network, wherein the GADAG is a graph abstraction of the network, wherein the plurality of network elements are the vertices of the GADAG and links connecting the plurality of network elements are the directed edges of the GADAG and wherein the GADAG has an arbitrary global root, and one or several local roots; and convert the GADAG into an almost directed acyclic graph, ADAG, by duplicating the local roots, except the arbitrary global root, virtually into two roots.

12. The network element according to any of claim 10, wherein the memory comprises instructions executable by the processor whereby the network element is further configured to compute the MRTs by determine all possible relations between the multiple sources and the multiple destinations in the ADAG.

13. The network element according to claim 12, wherein the memory comprises instructions executable by the processor whereby the network element is further configured to determine the relations by performing two graph traversal algorithms from each network element until ordering between all network elements are found.

14. The network element according to claim 12, wherein the network traffic is forwarded from two sources to two destinations and wherein the memory comprises instructions executable by the processor whereby the network element is further configured to determine the relations by performing six graph traversal algorithms from three of the four network elements.

15. The network element according to claim 10, wherein the memory comprises instructions executable by the processor whereby the network element is further configured to precompute and store all valid possible path pair(s) between the multiple sources and the multiple destinations in a table.

16. The network element according to claim 15, wherein the memory comprises instructions executable by the processor whereby the network element is further configured to determine valid path pair(s) by performing a lookup in the pre-stored table to retrieve any path pair(s) that is/are disjoint.

17. The network element according to claim 10, wherein the memory comprises instructions executable by the processor whereby the network element is further configured to use a tie-breaking rule to select one of the acceptable path pairs deterministically when there are multiple acceptable path pairs.

18. The network element according to claim 10, wherein the memory comprises instructions executable by the processor whereby the network element is further configured to select which path that is to belong to which source.

19. A computer storage medium storing a computer program, comprising instructions which, when executed on at least one processor, cause the at least one processor to perform a method for forwarding network traffic from multiple sources to multiple destinations on maximally disjoint paths by maximally redundant trees, MRTs, implemented in a network element implementing multipoint-to-multipoint functionalities in a path computation element, PCE, of a network, the network having a plurality of network elements, the method comprising:
- computing an almost directed acyclic graph, ADAG, for the network, the ADAG being a graph abstraction of the network, the plurality of network elements being the vertices of the ADAG and links connecting the plurality of network elements are the directed edges of the ADAG, the ADAG having an arbitrary root;
- computing, by the network element, next hops along MRTs using the ADAG;
- determining at least one valid path pair of the computed MRTs that is disjoint determining the at least one valid path pair being performed by using at least one of a contradiction and an ordering proof to the computed MRTs; and
- forwarding network traffic using the valid path pair(s) of the MRTs.

* * * * *